(12) United States Patent
Minamiura

(10) Patent No.: US 9,947,974 B2
(45) Date of Patent: Apr. 17, 2018

(54) HEATING SYSTEM AND BATTERY SYSTEM

(71) Applicant: TOYOTA JIDOSHA KABUSHIKI KAISHA, Toyota-shi, Aichi-ken (JP)

(72) Inventor: Keiichi Minamiura, Nagoya (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 132 days.

(21) Appl. No.: 14/902,240

(22) PCT Filed: Jul. 3, 2014

(86) PCT No.: PCT/IB2014/001260
§ 371 (c)(1),
(2) Date: Dec. 30, 2015

(87) PCT Pub. No.: WO2015/001415
PCT Pub. Date: Jan. 8, 2015

(65) Prior Publication Data
US 2016/0149275 A1    May 26, 2016

(30) Foreign Application Priority Data

Jul. 3, 2013 (JP) ................................ 2013-139936
Jun. 30, 2014 (JP) ................................ 2014-135266

(51) Int. Cl.
*H02J 7/00* (2006.01)
*H01M 10/615* (2014.01)
(Continued)

(52) U.S. Cl.
CPC ......... *H01M 10/615* (2015.04); *H01M 10/24* (2013.01); *H01M 10/4257* (2013.01);
(Continued)

(58) Field of Classification Search
CPC ....... Y02E 60/12; H02J 7/0042; H02J 7/0045; H01M 10/46; H01M 10/44
(Continued)

(56) References Cited

U.S. PATENT DOCUMENTS 5,304,915 A * 4/1994 Sanpei ............. G01R 19/16542
320/116
5,840,442 A * 11/1998 Abe ...................... H01M 10/44
429/206
(Continued)

FOREIGN PATENT DOCUMENTS

CN    101978542 A    2/2011
EP    1164680 A2    12/2001
(Continued)

*Primary Examiner* — Arun Williams
(74) *Attorney, Agent, or Firm* — Sughrue Mion, PLLC

(57) ABSTRACT

A heating system includes: an alkaline secondary battery and a controller. The alkaline secondary battery includes: a power generating element configured to be charged or discharged; and a battery case that accommodates the power generating element in a hermetically sealed state. The controller is configured to control charging and discharging of the alkaline secondary battery, and, when an internal pressure of the alkaline secondary battery is higher than or equal to a first threshold, execute a heating process for heating the alkaline secondary battery by decreasing the internal pressure through discharging of the alkaline secondary battery. The heating process is a process of raising a temperature of the alkaline secondary battery.

24 Claims, 7 Drawing Sheets

(51) Int. Cl.
*H01M 10/24* (2006.01)
*H01M 10/44* (2006.01)
*H01M 10/48* (2006.01)
*H01M 10/663* (2014.01)
*H01M 10/625* (2014.01)
*H01M 10/42* (2006.01)
*H01M 2/12* (2006.01)
*H01M 10/30* (2006.01)

(52) U.S. Cl.
CPC ....... *H01M 10/443* (2013.01); *H01M 10/445* (2013.01); *H01M 10/48* (2013.01); *H01M 10/486* (2013.01); *H01M 10/625* (2015.04); *H01M 10/663* (2015.04); *H02J 7/009* (2013.01); *H02J 7/0091* (2013.01); *H01M 2/12* (2013.01); *H01M 10/30* (2013.01); *H01M 2220/20* (2013.01); *Y02E 60/124* (2013.01)

(58) Field of Classification Search
USPC ........................................................ 320/107
See application file for complete search history.

(56) References Cited

U.S. PATENT DOCUMENTS

| | | | |
|---|---|---|---|
| 6,163,134 A * | 12/2000 | Powers | H01M 10/345 320/147 |
| 7,244,527 B2 | 7/2007 | Klein | |
| 9,664,123 B2 * | 5/2017 | Kageyama | F02D 29/02 |
| 2004/0266951 A1 * | 12/2004 | Akiyama | C08L 81/02 525/191 |
| 2005/0088140 A1 | 4/2005 | Bushong et al. | |
| 2011/0018491 A1 | 1/2011 | Yoshida et al. | |
| 2011/0309801 A1 * | 12/2011 | Kubota | H01M 10/42 320/162 |
| 2012/0305662 A1 | 12/2012 | Miyano | |
| 2013/0193928 A1 * | 8/2013 | Prosser | H02J 7/0042 320/130 |
| 2013/0239910 A1 * | 9/2013 | Teraya | B60W 10/06 123/41.02 |

FOREIGN PATENT DOCUMENTS

| | | |
|---|---|---|
| JP | 2003-102133 A | 4/2003 |
| JP | 2012-248452 A | 12/2012 |

* cited by examiner

HEATING SYSTEM AND BATTERY SYSTEM

BACKGROUND OF THE INVENTION

1. Field of the Invention

The invention relates to a heating system, and a battery system that raise the temperature of an alkaline secondary battery.

2. Description of Related Art

In Japanese Patent Application Publication No. 2003-102133 (JP 2003-102133 A), the SOC of a secondary battery, at which the amount of heat generated by the secondary battery is maximum, is calculated. The secondary battery is charged or discharged such that the SOC follows the calculated SOC. Thus, the secondary battery is heated.

SUMMARY OF THE INVENTION

In an alkaline secondary battery, gas (mainly, oxygen gas) is produced inside the alkaline secondary battery. The internal pressure of the alkaline secondary battery increases with an increase in the gas or the internal pressure of the alkaline secondary battery decreases with a reduction in the gas. Here, when the internal pressure of the alkaline secondary battery is decreased from a state where the internal pressure is high, heat of reaction is generated at the time when gas inside the alkaline secondary battery reduces. The alkaline secondary battery is allowed to be heated by the heat of reaction. The invention provides a heating system and a battery system that heat an alkaline secondary battery by focusing on this point.

An aspect of the invention provides a heating system. The heating system includes an alkaline secondary battery and a controller. The alkaline secondary battery includes: a power generating element configured to be charged or discharged; and a battery case that accommodates the power generating element in a hermetically sealed state. The controller is configured to control charging and discharging of the alkaline secondary battery. When an internal pressure of the alkaline secondary battery is higher than or equal to a first threshold, the controller is configured to execute a heating process for heating the alkaline secondary battery by decreasing the internal pressure through discharging of the alkaline secondary battery. The heating process is a process of raising a temperature of the alkaline secondary battery.

When the internal pressure of the alkaline secondary battery rises and is higher than or equal to the first threshold, gas (mainly, oxygen gas) is produced inside the alkaline secondary battery. The internal pressure of the alkaline secondary battery rises due to the gas. The gas is a gas that is produced through a secondary chemical reaction (side reaction) inside the alkaline secondary battery. The side reaction is different from a chemical reaction associated with charging and discharging of the alkaline secondary battery. When the internal pressure of the alkaline secondary battery is decreased, it is possible to reduce the amount of gas with a chemical reaction (so-called side reaction) of gas inside the alkaline secondary battery. As a result, the internal pressure of the alkaline secondary battery decreases. The side reaction at the time when the internal pressure is decreased is an exothermic reaction. Therefore, it is possible to heat the alkaline secondary battery by using the heat of reaction. According to the above aspect, the heating system actively decreases the internal pressure of the alkaline secondary battery, which is higher than or equal to the first threshold. Here, the alkaline secondary battery also generates heat through energization (discharging). Thus, it is possible to heat the alkaline secondary battery by using heat generated during energization (during discharging) and heat generated as a result of the side reaction.

In the above aspect, when the heating process is executed and the internal pressure is lower than or equal to a second threshold lower than the first threshold, the controller may be configured to raise the internal pressure by charging the alkaline secondary battery.

By charging the alkaline secondary battery, it is possible to raise the internal pressure of the alkaline secondary battery. Specifically, when the internal pressure of the alkaline secondary battery is lower than or equal to the second threshold, it is possible to raise the internal pressure of the alkaline, secondary battery by charging the alkaline secondary battery. The second threshold is a value lower than the first threshold. Here, the alkaline secondary battery also generates heat through charging or discharging. Thus, it is possible to heat the alkaline secondary battery by using heat generated during charging or discharging and heat generated as a result of the side reaction.

In the above aspect, when the heating process is executed, the controller may be configured to vary the internal, pressure between the first threshold and the second threshold by alternately executing a process of raising the internal pressure and a process of decreasing the internal pressure.

Thus, it is possible to cause the side reaction (exothermic reaction) to occur multiple times. Therefore, it is possible to easily raise the temperature of the alkaline secondary battery, so it is also possible to reduce a time during which the heating process is executed.

In the above aspect, the controller may be configured to control charging and discharging of the alkaline secondary, battery such that an SOC of the alkaline secondary battery varies along with a target SOC. Furthermore, the controller may be configured to set a first SOC corresponding to the first threshold for the target SOC when the internal pressure is raised and set a second SOC corresponding to the second threshold for the target SOC when the internal pressure is decreased. The second SOC is a value lower than the first SOC.

When charging and discharging of the alkaline secondary battery are controlled, it is possible to vary the state of charge (SOC) of the alkaline secondary battery along with the target SOC. The target SOC is a reference SOC at the time when charging and discharging of the alkaline secondary battery are controlled. Here, when the internal pressure of the alkaline secondary battery is raised, the first SOC corresponding to the first threshold is set for the target SOC. When the first SOC is set for the target SOC, it is possible to raise the internal pressure of the alkaline secondary battery to the first threshold. When the internal pressure is decreased, the second SOC corresponding to the second threshold is set for the target SOC. The second SOC is a value lower than the first SOC. When the second SOC is set for the target SOC, it is possible to decrease the internal pressure of the alkaline secondary battery to the second threshold.

In the above aspect, the first SOC may be higher than a target SOC that is preset at the time when the heating process is not executed, and the second SOC may be lower than the target SOC that is preset at the time when the heating process is not executed.

When the first SOC is set in this way, it is possible to easily raise the SOC of the alkaline secondary battery. Therefore, it is possible to increase the amount of produced gas that is used in the side reaction (exothermic reaction) that occurs inside the alkaline secondary battery. By increasing the amount of produced gas, it is possible to cause the side reaction (exothermic reaction) to easily occur, so it is possible to easily heat the alkaline secondary battery.

When the second SOC is set as described above, it is possible to cause the SOC of the alkaline secondary battery to easily decrease, and it is possible to increase the difference between the first SOC and the second SOC (the difference between the first threshold and the second threshold). As a result, it is possible to cause the side reaction (exothermic reaction) to easily occur inside the alkaline secondary battery, so it is possible to easily heat the alkaline secondary battery.

In the above aspect, the controller may be configured to control charging of the alkaline secondary battery such that the SOC of the alkaline secondary battery varies within a range lower than or equal to an upper limit SOC. Furthermore, the controller may be configured to raise the upper limit SOC above the upper limit SOC that is set at the time when the heating process is not executed, when the first SOC is set.

Thus, it is possible to inhibit a situation that charging of the alkaline secondary battery is easily limited by the upper limit SOC. Furthermore, by charging the alkaline secondary battery, it is possible to increase the amount of produced gas that is used in the side reaction that occurs inside the alkaline secondary battery. Here, the upper limit SOC is set as needed in consideration of an overcharged state, or the like, of the alkaline secondary battery.

In the above aspect, the controller may be configured to control charging of the alkaline secondary battery such that an electric power that is input to the alkaline secondary battery varies within a range lower than or equal to an upper limit electric power that is set on the basis of the temperature of the alkaline secondary battery, and the controller may be further configured to raise the upper limit electric power above the upper limit electric power that is set at the time when the heating process is not executed, when the first SOC is set.

As described above, by raising the upper limit electric power, it is possible to cause the alkaline secondary battery to be easily charged, so it is possible to increase the amount of produced gas that is used in the side reaction that occurs inside the alkaline secondary battery. Here, the upper limit electric power is set as needed in consideration of the input characteristics, and the like, of the alkaline secondary battery. The upper limit electric power is changed on the basis of the temperature of the alkaline secondary battery.

In the above aspect, the controller may be configured to change at least one of the first threshold and the second threshold.

In the above aspect, the heating system may be mounted on a vehicle including an engine, and the controller may be configured to raise the internal pressure by charging the alkaline secondary battery by using an output of the engine when the following a) and b) are satisfied, a) a passenger compartment of the vehicle is heated by using coolant that cools the engine, and b) the engine, is driven until the temperature of the coolant becomes higher than or equal to a reference temperature.

In the vehicle including the engine, when the alkaline secondary battery is actively driven although the engine is allowed to be intermittently driven, there is a concern that an occupant, or the like, of the vehicle may experience a feeling of strangeness. The engine is continuously driven until the temperature of coolant for cooling the engine reaches the reference temperature. As described above, by charging the alkaline secondary battery at the time when the engine is being driven, it is possible to suppress a feeling of strangeness experienced by a user, or the like, of the vehicle.

In the above aspect, the heating system may include a temperature sensor configured to detect a temperature of the alkaline secondary battery, wherein the controller may be configured to execute the heating process when the temperature detected by the temperature sensor is lower than or equal to a predetermined temperature. Alternatively, the heating system may include a current sensor configured to detect a current value of the alkaline secondary battery. The controller may be configured to estimate the internal pressure on the basis of the oxygen pressure that is estimated on the basis of an equilibrium hydrogen pressure inside the alkaline secondary battery and an amount of increase in oxygen gas and an amount of reduction in the oxygen gas inside the alkaline secondary battery. The controller is configured to calculate the equilibrium hydrogen pressure on the basis of the temperature of the alkaline secondary battery. The controller is configured to calculate the amount of increase in the oxygen gas on the basis of the current value of the alkaline secondary battery when the alkaline secondary battery is charged. The controller is configured to calculate the amount of reduction in the oxygen gas on the basis of the temperature of the alkaline secondary battery.

When the internal pressure is raised or the internal pressure is decreased, it is possible to monitor the internal pressure of the alkaline secondary battery. Here, the internal pressure of the alkaline secondary battery may be detected by a pressure sensor. Alternatively, the internal pressure of the alkaline secondary battery may be estimated. Specifically, the internal pressure of the alkaline secondary battery may be estimated on the basis of the equilibrium hydrogen pressure and the oxygen pressure that is estimated on the basis of the amount of increase in the oxygen gas and the amount of reduction in the oxygen gas inside the alkaline secondary battery.

The equilibrium hydrogen pressure depends on the temperature of the alkaline secondary battery. Therefore, by detecting the temperature of the alkaline secondary battery with the temperature sensor, it is possible to acquire the equilibrium hydrogen pressure. The amount of increase in the oxygen gas depends on the current value of the alkaline secondary battery when the alkaline secondary battery is charged. Therefore, by detecting the current value of the alkaline secondary battery during charging with the current sensor, it is possible to acquire the amount of increase in the oxygen gas. The amount of reduction in the oxygen gas depends on the oxygen pressure. Therefore, every time by detecting the hydrogen pressure, it is possible to acquire the amount of reduction in the oxygen gas.

Another aspect of the invention provides a battery system. The battery system includes an alkaline secondary battery, a temperature sensor configured to detect a temperature of the alkaline secondary battery, and a controller. The controller is configured to execute a first process at least once when the temperature detected by the temperature sensor is lower than or equal to a predetermined temperature. The first process is a process of decreasing an internal pressure of the alkaline secondary battery.

By executing the first process, the side reaction occurs inside the alkaline secondary battery. Thus, when the first process is executed at the time when the temperature of the alkaline secondary battery is lower than or equal to the predetermined temperature, it is possible to raise the temperature of the alkaline secondary battery.

In the above aspect, the controller may be configured to alternately execute the first process and a second process multiple times when the temperature detected by the temperature sensor is lower than or equal to a predetermined temperature. The second process may be a process of raising the internal pressure of the alkaline secondary battery.

By alternately executing the first process and the second process multiple times, the amount of heat generation due to the side reaction increases. Thus, by alternately executing the first process and the second process multiple times when the temperature of the alkaline secondary battery is lower than or equal to the predetermined temperature, it is possible to quickly raise the temperature of the alkaline secondary battery.

In the above aspect, the controller may be configured to execute the second process and then execute the first process when the temperature detected by the temperature sensor is lower than a predetermined temperature.

The second process is executed and then the first process is executed, so the amount of heat generation due to the side reaction through the first process increases. Thus, the first process is executed after the second process is executed, so it is possible to increase the amount of rise in the temperature of the alkaline secondary battery due to the first process.

In the above aspect, when the temperature detected by the temperature sensor is lower than a predetermined temperature, the controller may be configured to execute the first process after the internal pressure of the alkaline secondary battery has reached a first threshold and execute the second process after the internal pressure of the alkaline secondary battery has reached a second threshold, the first threshold being higher than the second threshold.

When the internal pressure of the alkaline secondary battery has reached the first threshold, it is possible to stop the process of raising the internal pressure and start the process of decreasing the internal pressure. When the internal pressure of the alkaline secondary battery has reached the second threshold, it is possible to stop the process of decreasing the internal pressure and start the process of raising the internal pressure. Thus, it is possible to vary the internal pressure of the alkaline secondary battery between the first threshold and the second threshold. Here, the first threshold and the second threshold may be a fixed value, or at least one of the first threshold and the second threshold may be varied. When the first threshold or the second threshold is changed, it is possible to vary a state where the side reaction (exothermic reaction) occurs, so it is possible to adjust the amount of heat generation.

In the above aspect, the controller may be configured to execute the first process by discharging the alkaline secondary battery. Alternatively, the controller may be configured to execute the second process by charging the alkaline secondary battery.

When the alkaline secondary battery is charged or discharged, heat associated with energization is also generated. Thus, the first process and the second process are executed through charging and discharging of the alkaline secondary battery, so it is possible to quickly raise the temperature of the alkaline secondary battery.

In the above aspect, when the temperature detected by the temperature sensor becomes higher than a predetermined temperature, the controller may be configured to stop at least the first process.

When the temperature of the alkaline secondary battery becomes higher than the predetermined temperature, it is possible to suppress an excessive rise in the temperature of the alkaline secondary battery by stopping the first process.

In the above aspect, the controller may be configured to control an SOC of the alkaline secondary battery. The controller may be configured to execute the first process by setting a target SOC of the alkaline secondary battery to a first target SOC when the temperature detected by the temperature sensor is lower than a predetermined temperature. The controller may be configured to execute the second process by setting a target SOC of the alkaline secondary battery to a second target SOC. The first target SOC is lower than the target SOC at the time when the temperature is higher than a predetermined temperature. The second target SOC is higher than the target SOC at the time when the temperature is higher, than a predetermined temperature.

By varying the target SOC of the alkaline secondary battery, it is possible to vary the internal pressure of the alkaline secondary battery. Thus, by setting the target SOC of the alkaline secondary battery to the first target SOC or the second target SOC when the temperature of the alkaline secondary battery is lower than the predetermined temperature, it is possible to raise the temperature of the alkaline secondary battery.

In the above aspect, when the temperature detected by the temperature sensor becomes higher than a predetermined temperature, the controller may be configured to set the target SOC of the alkaline secondary battery to a predetermined target SOC.

When the temperature of the alkaline secondary battery becomes higher than the predetermined temperature, it is possible to suppress an excessive rise in the temperature of the alkaline secondary battery by setting the target SOC of the alkaline secondary battery to the predetermined target SOC.

In the above aspect, the battery system may be mounted on a vehicle including an engine. The controller may be configured to set the target SOC of the alkaline secondary battery to the first target SOC when the engine is being driven.

It is possible to control the SOC of the alkaline secondary battery without forcibly driving the engine at the time when the engine is not driven.

In the above aspect, the controller may be configured to charge the alkaline secondary battery by driving the engine when the temperature of coolant of the engine is lower than a reference temperature.

In the above aspect, the vehicle may include an air conditioner. The controller may be configured to charge the alkaline secondary battery by driving the engine when the air conditioner is set in a heating mode and the temperature of the coolant of the engine is lower than the reference temperature.

In the above aspect, the controller may be configured to intermittently drive the engine when the temperature of the coolant of the engine is higher than the reference temperature.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described.

Figure 1:
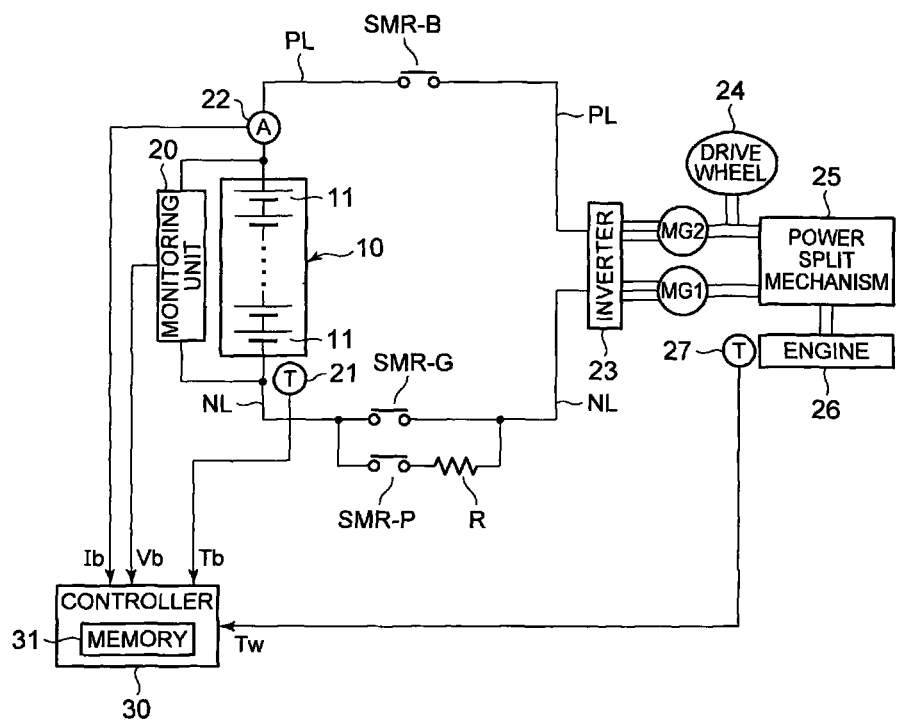
FIG. 1 is a view that shows the configuration of a battery system.

FIG. 1 is a view that shows the configuration of a battery system according to the present embodiment. The battery system is mounted on a vehicle. As will be described later, the vehicle is a so-called hybrid vehicle that is able to travel while using a battery pack 10 and an engine 26 in combination.

The battery pack 10 includes a plurality of serially connected single cells 11. An alkaline secondary battery, such as a nickel-metal hydride battery and a nickel-cadmium battery, is used as each single cell 11. The number of the single cells 11 may be set as needed on the basis of a required output, or the like, of the battery pack 10. The battery pack 10 may include a plurality of the single cells 11 that are connected in parallel with each other.

Figure 2:
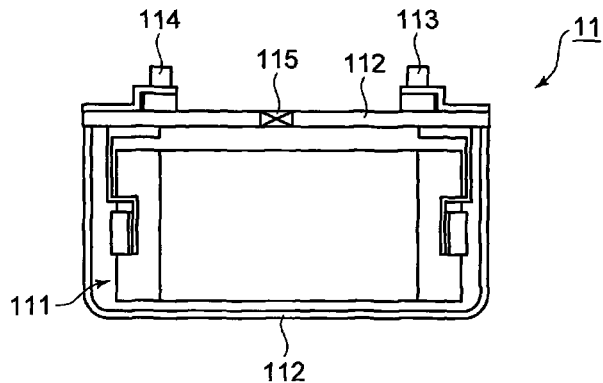
FIG. 2 is a view that shows the structure of a single cell.
Figure 3:
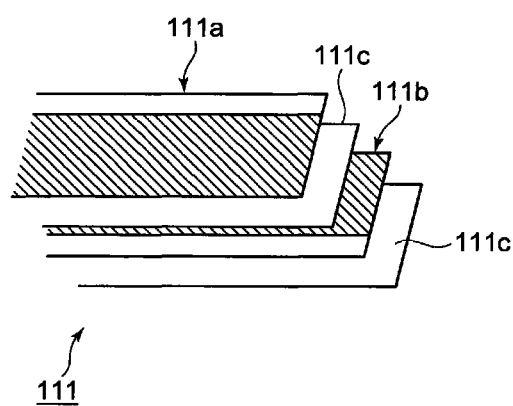
FIG. 3 is a view that shows the structure of a power generating element.

As shown in FIG. 2, each of the single cells 11 includes a power generating element 111 that is charged or discharged and a battery case 112 that accommodates the power generating element 111 in a hermetically sealed state. As shown in FIG. 3, the power generating element 111 includes a positive electrode plate 111*a*, a negative electrode plate 111*b* and a separator 111*c* arranged between the positive electrode plate 111*a* and the negative electrode plate 111*b*. The positive electrode plate 111*a* has a current collector and a positive electrode active material layer formed on the surface of the current collector. The negative electrode plate 111*b* has a current collector and a negative electrode active material layer formed on the surface of the current collector.

As shown in FIG. 3, the positive electrode plate 111*a*, the negative electrode plate 111*b* and the separator 111*c* are laminated on top of each other, and the laminate is rolled. Thus, the power generating element 111 shown in FIG. 2 is formed. An electrolytic solution is osmosed in the separator 111*c*. Instead of the separator 111*c*, a fixed electrolyte layer may be used. A positive electrode terminal 113 is connected to the positive electrode plate 111*a* of the power generating element 111. A negative electrode terminal 114 is connected to the negative electrode plate 111*b* of the power generating element 111.

As shown in FIG. 2, the battery case 112 includes a valve 115. The valve 115 is used to emit gas, produced inside the battery case 112, to the outside of the battery case 112. As the internal pressure of the battery case 112 reaches an operating pressure of the valve 115, the valve 115 changes from a closed state to an open state. As the valve 115 changes into the open state, gas produced inside the battery case 112 is emitted to the outside of the battery case 112. A valve that irreversibly changes from a closed state to an open state may be used as the valve 115. A valve that reversibly changes between a closed state and an open state may also be used as the valve 115. A known structure may be employed as the structure of the valve 115 as needed. In FIG. 2, a so-called square battery is used as the single cell 11. Instead, a so-called cylindrical battery may also be used.

A monitoring unit (which corresponds to a voltage sensor according to the invention) 20 detects the voltage value of the battery pack 10 or the voltage value of each single cell 11, and outputs the detected result to a controller 30. Here, when all the single cells 11 that constitute the battery pack 10 are divided into a plurality of battery blocks, the monitoring unit 20 may detect the voltage value of each battery block.

Each battery block is formed of a plurality of the serially connected single cells 11. The battery pack 10 is formed such that the plurality of battery blocks are connected in series with each other. For example, a plurality of the power generating elements 111 are accommodated in a single case, and are electrically connected. In this way, each battery block is formed. Each battery block may include a plurality of the single cells 11 (power generating elements 111) connected in parallel with each other.

A temperature sensor 21 detects the temperature Tb of the battery pack 10 (single cells 11), and outputs the detected result to the controller 30. If a plurality of the temperature sensors 21 are used, it becomes easy to accurately detect the temperature of each of a plurality of the single cells 11 arranged at mutually different locations. When a plurality of the temperature sensors 21 are used, the number of temperature sensors 21 is set as needed.

A current sensor 22 is provided in a positive electrode line PL connected to the positive electrode terminal of the battery pack 10. The current sensor 22 detects a current value (charge current or discharge current) Ib flowing through the battery pack 10, and outputs the detected result to the controller 30. In the present embodiment, when the battery pack 10 is being discharged, the current value Ib that is detected by the current sensor 22 is treated as a positive value. When the battery pack 10 is being charged, the current value Ib that is detected by the current sensor 22 is treated as a negative value.

The current sensor 22 just needs to be able to detect the current value Ib of the battery pack 10. Thus, in the present embodiment, the current sensor 22 is provided in the positive electrode line PL; however, a location at which the current sensor 22 is provided may be set as needed. Specifically, the current sensor 22 is allowed to be provided in at least one of the positive electrode line PL and a negative electrode line NL. The negative electrode line NL is connected to the negative electrode terminal of the battery pack 10. A plurality of the current sensors 22 may be provided.

The controller 30 includes a memory 31. The memory 31 stores various pieces of information, which are used when the controller 30 executes a predetermined process (particularly, a process described in the present embodiment). In the present embodiment, the memory 31 is incorporated in the controller 30; instead, the memory 31 may be provided outside the controller 30.

A system main relay SMR-B is provided in the positive electrode line PL. The system main relay SMR-B switches between an on state and an off state upon reception of a control signal from the controller 30. A system main relay SMR-G is provided in the negative electrode line NL. The system main relay SMR-G switches between an on state and an off state upon reception of a control signal from the controller 30.

A system main relay SMR-P and a resistive element R are connected in parallel with the system main relay SMR-G. The system main relay SMR-P and the resistive element R are connected in series with each other. The system main relay SMR-P switches between an on state and an off state upon reception of a control signal from the controller 30. Inrush current flows at the time when the battery pack 10 is connected to a load (specifically, an inverter 23 (described later)). The resistive element R suppresses flow of the inrush current.

The battery pack 10 is connected to the inverter 23 via the positive electrode line PL and the negative electrode line NL. When the battery pack 10 is connected to the inverter 23, the controller 30 switches the system main relay SMR-B from the off state to the on state, and switches the system main relay SMR-P from the off state to the on state. Thus, current flows through the resistive element R.

Subsequently, the controller 30 switches the system main relay SMR-G from the off state to the on state, and switches the system main relay SMR-P from the on state to the off state. Thus, connection of the battery pack 10 with the inverter 23 is completed, and the battery system shown in FIG. 1 enters an activated state (ready-on state). Information about the on/off state of an ignition switch of the vehicle is input to the controller 30. The controller 30 starts up the battery system shown in FIG. 1 when the ignition switch is switched from the off state to the on state.

On the other hand, when the ignition switch is switched from the on state to the off state, the controller 30 switches the system main relays SMR-B, SMR-G from the on state to the off state. Thus, connection of the battery pack 10 with the inverter 23 is interrupted, and the battery system shown in FIG. 1 enters a stopped state (ready-off state).

The inverter 23 converts direct-current power, output from the battery pack 10, to alternating-current power, and outputs the alternating-current power to a motor generator MG2. The motor generator MG2 generates kinetic energy for propelling the vehicle upon reception of the alternating-current power output from the inverter 23. The motor generator MG2 is connected to a drive wheel 24 via a speed reduction gear, and the like. The kinetic energy generated by the motor generator MG2 is transmitted to the drive wheel 24, and the vehicle travels.

A power split mechanism 25 transmits the power of the engine 26 to the drive wheel 24 or transmits the power of the engine 26 to a motor generator MG1. The motor generator MG1 generates electric power upon reception of the power, of the engine 26. The electric power (alternating-current power) generated by the motor generator MG1 is supplied to the motor generator MG2 and the battery pack 10 via the inverter 23. When the electric power generated by the motor generator MG1 is supplied to the motor generator MG2, the motor generator MG2 generates kinetic energy, and the drive wheel 24 is driven. When the electric power generated by the motor generator MG1 is supplied to the battery pack 10, the battery pack 10 is charged.

When the vehicle is decelerated or the vehicle is stopped, the motor generator MG2 converts kinetic energy, generated during braking of the vehicle, to electric energy (alternating-current power). The inverter 23 converts alternating-current power, generated by the motor generator MG2, to direct-current power, and outputs the direct-current power to the battery pack 10. Thus, the battery pack 10 stores regenerative electric power.

The temperature sensor 27 detects the temperature Tw of liquid (coolant) that is used to cool the engine 26, and outputs the detected result to the controller 30. When the engine 26 is started, heat generated by the engine 26 is transmitted to the coolant. Thus, it is possible to heat a passenger compartment of the vehicle by using the heated coolant. A known configuration is employed as needed to heat the passenger compartment with the coolant. A detailed description about heating of the passenger compartment with the coolant is omitted. The passenger compartment is a space in which a passenger is seated.

In the present embodiment, the battery pack 10 is connected to the inverter 23; however, the battery pack 10 is not limited to this configuration. Specifically, a step-up circuit may be provided in a current path between the battery pack 10 and the inverter 23. The step-up circuit is able to step up the output voltage of the battery pack 10 and then to output the stepped-up electric power to the inverter 23. In addition, the step-up circuit is able to step down the output voltage of the inverter 23 and then to output the stepped-down electric power to the battery pack 10.

The battery system according to the present embodiment includes the two motor generators MG1, MG2; however, the battery system is not limited to this configuration. The invention is also applicable to, for example, a system that includes a single motor generator. The system that includes a single motor generator is able to cause the vehicle to travel by using the power of the engine while causing the motor generator to generate electric power.

The nickel-metal hydride battery that serves as each single cell 11 is charged or discharged through the reactions expressed by the following formulae (1), (2).

$$\text{NiOOH} + \text{H}_2\text{O} + e^- \leftrightarrow \text{Ni(OH)}_2 + \text{OH}^- \quad (1)$$

$$\text{MH}_x + \text{OH}^- \leftrightarrow \text{MH}_{x-1} + \text{H}_2\text{O} + e^- \quad (2)$$

The formula (1) expresses a chemical reaction at the positive electrode. During discharging, the reaction proceeds from the left-hand side of the formula (1) to the right-hand side of the formula (1). During charging, the reaction proceeds from the right-hand side of the formula (1) to the left-hand side of the formula (1). The formula (2) expresses a chemical reaction at the negative electrode. During discharging, the reaction proceeds from the left-hand side of the formula (2) to the right-hand side of the formula (2). During charging, the reaction proceeds from the right-hand side of the formula (2) to the left-hand side of the formula (2).

When each single cell 11 is charged, hydroxide ions OH$^-$ are decomposed through electrolysis and oxygen gas O$_2$ is produced at the positive electrode as shown in the formula (3). The formula (3) expresses a side reaction at the positive electrode. The side reaction is a reaction different from the chemical reaction (chemical reactions expressed by the reactions (1), (2)) associated with charging and discharging of each single cell 11, and is a reaction that secondarily occurs.

Because of production of oxygen gas O$_2$, the internal pressure of the single cell 11 (the internal pressure of the battery case 112) rises. Because the battery case 112 is in a hermetically sealed state, when oxygen gas O$_2$ is produced inside the battery case 112, the internal pressure of the single cell 11 rises. It is possible to increase the amount of produced oxygen gas O$_2$ as the single cell 11 is charged.

$$\text{OH}^- \rightarrow \frac{1}{4}\text{O}_2 + \frac{1}{2}\text{H}_2\text{O} + e^- \quad (3)$$

On the other hand, when the single cell 11 is discharged, a chemical reaction (side reaction) expressed by the formula (4) occurs at the negative electrode. As expressed by the formula (4), the oxygen gas $O_2$ produced at the positive electrode reacts with water $H_2O$ at the negative electrode, and hydroxide ions $OH^-$ are produced.

$$\frac{1}{4}O_2 + \frac{1}{2}H_2O + e^- \rightarrow OH^- \quad (4)$$

With the side reaction expressed by the formula (4), the amount of oxygen gas $O_2$ reduces, so the internal pressure of the single cell 11 decreases. In addition, when the side reaction expressed by the formula (4) is carried out, heat (heat of reaction) is generated. In the present embodiment, the temperature Tb of the single cells 11 (battery pack 10) is raised by utilizing this heat. Here, as the amount of oxygen gas $O_2$ is increased, the side reaction expressed by the formula (4) more easily occurs, and heat is more easily generated. When the single cells 11 are charged or discharged, heat associated with energization is also generated. Therefore, in the present embodiment, it is possible to raise the temperature Tb of the single cells 11 by utilizing heat associated with the side reaction (exothermic reaction) and heat associated with energization.

In the above description, the nickel-metal hydride battery is described as an example; however, even another alkaline secondary battery also exhibits a similar behavior to that of the nickel-metal hydride battery. Another alkaline secondary battery is, for example, a nickel-cadmium battery, or the like. That is, even another alkaline secondary battery is also able to increase the amount of oxygen gas $O_2$ through charging, and is able to reduce the amount of oxygen gas $O_2$ through discharging.

Figure 4:
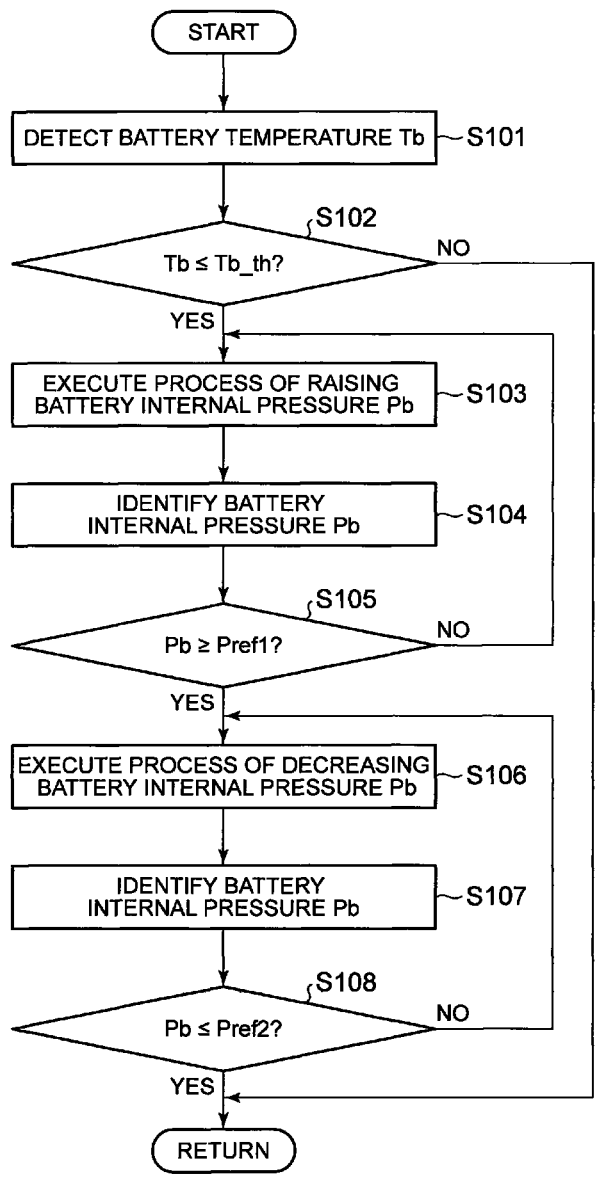
FIG. 4 is a flowchart that shows a heating process for heating single cells (battery pack)

Next, the process of heating the single cells 11 (battery pack 10) will be described with reference to, the flowchart shown in FIG. 4. The process shown in FIG. 4 is executed by the controller 30.

In step S101, the controller 30 detects the temperature Tb of the single cells 11 (battery pack 10) on the basis of the output of the temperature sensor 21. In step S102, the controller 30 determines whether the battery temperature Tb detected in the process of step S101 is lower than or equal to a predetermined temperature Tb_th.

The predetermined temperature Tb_th is a threshold for determining whether it is required to heat the single cells 11 (battery pack 10). The predetermined temperature Tb_th may be set in advance. The input/output characteristics of the single cells 11 (battery pack 10) depend on the temperature Tb of the single cells 11 (battery pack 10). Therefore, the predetermined temperature Tb_th may be set in consideration of the input/output characteristics. Information about the predetermined temperature Tb_th may be stored in the memory 31.

When the battery temperature Tb is lower than or equal to the predetermined temperature Tb_th, the controller 30 determines that it is required to heat the single cells 11 (battery pack 10), and executes the process from step S103. On the other hand, when the battery temperature Tb is higher than the predetermined temperature Tb_th, the controller 30 determines that it is not required to heat the single cells 11 (battery pack 10), and ends the process shown in FIG. 4.

In step S103, the controller 30 executes the process of raising the internal pressure Pb of each single cell 11. Specifically, the controller 30 is able to raise the internal pressure Pb of each single cell 11 by charging the single cells 11 (battery pack 10). It is possible to cause the side reaction expressed by the formula (3) to occur, and it is possible to raise the internal pressure Pb by increasing the amount of oxygen gas. When the single cells 11 are charged, the output of the engine 26 is, for example, allowed to be used. The single cells 11 are allowed to be charged with the above-described regenerative electric power. That is, when regenerative electric power is generated at the time when the internal pressure Pb is raised, the single cells 11 are allowed to be charged with the regenerative electric power.

In step S104, the controller 30 identifies the internal pressure Pb of each single cell 11. Identifying the internal pressure Pb includes detecting the internal pressure Pb and estimating the internal pressure Pb. Because the reactions expressed by the formulas (3) and (4) are the side reactions, it is required to know the internal pressure Pb and to know increase and decrease of oxygen gas involved in occurring heat of reaction.

When a pressure sensor that detects the internal pressure Pb of each single cell 11 is used, the controller 30 is able to detect the internal pressure Pb on the basis of the output of the pressure sensor. Here, the pressure sensor may be arranged inside or outside each battery case 112. As the internal pressure Pb of each single cell 11 rises, each battery case 112 expands. Therefore, when the pressure sensor is arranged outside each battery case 112 as well, the internal pressure Pb is allowed to be detected by detecting expansion of the battery case 112 with the use of the pressure sensor.

On the other hand, the controller 30 is able to calculate (estimate) the internal pressure Pb on the basis of the temperature Tb, the current value Ib, voltage value Vb, or the like, of the single cells 11. Hereinafter, (one example of) a method of estimating the internal pressure Pb will be described. The method of estimating the internal pressure Pb is not limited to a method that will be described below. A known method may be employed as needed as the method of estimating the internal pressure Pb.

The internal pressure Pb of each single cell 11 is calculated from the sum of an equilibrium hydrogen pressure and an oxygen pressure inside the single cell 11 (battery case 112). The equilibrium hydrogen pressure depends on the temperature Tb of the single cell 11, so it is possible to calculate the equilibrium hydrogen pressure from the battery temperature Tb.

Specifically, a correlation between the battery temperature Tb and the equilibrium hydrogen pressure is obtained in advance through an experiment, or the like. By detecting the battery temperature Tb, it is possible to calculate the equilibrium hydrogen pressure corresponding to this battery temperature Tb on the basis of the above-described correlation. The correlation between the battery temperature Tb and the equilibrium hydrogen pressure may be expressed by a map or a function. Information about the correlation may be stored in the memory 31.

On the other hand, the oxygen pressure is calculated on the basis of the amount of produced oxygen gas (the amount of increase in oxygen gas) and the amount of reduction in oxygen gas inside each single cell 11. The amount of produced oxygen gas is calculated from the current value Ib and charging efficiency of the single cells 11 (battery pack 10). The amount of reduction in oxygen gas depends on the oxygen pressure, so it is possible to calculate the amount of reduction in oxygen gas from the oxygen pressure.

Specifically, the oxygen pressure is allowed to be calculated on the basis of the mathematical expression (5).

$$P_n = P_{n-1} + K_p \times (\alpha - \gamma) \times \Delta t \quad (5)$$

In the mathematical expression (5), $P_n$ denotes an oxygen pressure that is calculated this time, and $P_{n-1}$ denotes an oxygen pressure calculated last time. $K_p$ denotes a constant for converting the amount of oxygen gas to an oxygen pressure. $\alpha$ denotes the amount of produced oxygen gas. $\gamma$ denotes the amount of reduction in oxygen gas. $\Delta t$ is a period at which the oxygen pressure is calculated. $\Delta t$ is allowed to be set as needed. According to the mathematical expression (5), the oxygen pressure Pn is increased as the oxygen gas is increased and the oxygen pressure Pn is reduced as the oxygen gas is reduced.

The amount a of produced oxygen gas is allowed to be calculated on the basis of the mathematical expression (6) or the mathematical expression (7).

$$\alpha = Ib \times \beta \times K_\alpha \qquad (6)$$

$$\alpha = Ib \times (1-\eta) \times K_\alpha \qquad (7)$$

In the mathematical expression (6) or the mathematical expression (7), $\alpha$ denotes the amount of produced oxygen gas per unit time (cycle) $\Delta t$, Ib denotes the current value of the single cells 11 (battery pack 10), and $K_\alpha$ denotes a constant based on the unit of the amount a of produced oxygen gas. $\beta$ shown in the above mathematical expression (6) and $\eta$ shown in the above mathematical expression (7) each are the charging efficiency of the single cells 11.

The charging efficiency $\eta$ is the ratio of the amount of actually stored electric charge to the amount (maximum amount) of electric charge to which the single cells 11 are allowed to be charged. The charging efficiency $\beta$ corresponds to the value of "$1-\eta$". That is, the charging efficiency $\beta$ is the ratio of the amount of electric charge that has not been stored due to production of gas, or the like, to the amount (maximum amount) of electric charge to which the single cells 11 are allowed to be charged. Here, when the charging efficiency $\eta$ is calculated, the charging efficiency $\beta$ is allowed to be calculated. When the charging efficiency $\beta$ is calculated, the charging efficiency $\eta$ is allowed to be calculated.

The charging efficiency $\eta$ (or the charging efficiency $\beta$) is allowed to be calculated from the open circuit voltage (OCV) of the single cells 11. Specifically, a correlation (map or function) between the charging efficiency $\eta$ and the OCV is obtained in advance through an experiment, or the like. By measuring the OCV, it is possible to calculate the charging efficiency $\eta$ on the basis of the correlation. Information about the correlation may be stored in the memory 31.

The charging efficiency $\eta$ tends to depend on the temperature Tb and current value Ib of the single cells 11 (battery pack 10). Therefore, when the charging efficiency $\eta$ is calculated, it is allowed to take into consideration not only the OCV but also at least one of the battery temperature Tb and the current value Ib. In this case, the correlation between the charging efficiency $\eta$, the OCV and at least one of the battery temperature Tb and the current value Ib may be prepared.

The amount of reduction $\gamma$ of oxygen gas depends on the oxygen pressure P. Therefore, a correlation (map or function) between the amount of reduction $\gamma$ and the oxygen pressure P is obtained in advance through an experiment, or the like. By identifying the oxygen pressure P, it is possible to calculate the amount of reduction $\gamma$ on the basis of the above correlation. Information about the correlation between the amount of reduction $\gamma$ and the oxygen pressure P may be stored in the memory 31. Here, when the oxygen pressure $P_n$ is calculated, the amount of reduction $\gamma$ is allowed to be calculated from the oxygen pressure $P_{n-1}$.

When the initial oxygen pressure $P_n$ is calculated, a predetermined value (for example, atmospheric pressure) may be set for the oxygen pressure $P_{n-1}$. When the initial amount of reduction $\gamma$ in oxygen gas is calculated, a predetermined value (for example, atmospheric pressure) may be used as the oxygen pressure P. On the other hand, when the reduction $\gamma$ in oxygen, it is considered not only the oxygen pressure P but also the battery temperature Tb and the current value Ib (the current value at the time of discharging). In particular, if the correlation (map or function) of the reduction $\gamma$, the oxygen pressure P and the battery temperature Tb is obtained in advance through an experiment, it is possible to calculate the reduction $\gamma$ by identifying the oxygen pressure P and the battery temperature Tb. In addition, if the correlation (map or function) of the reduction $\gamma$, the oxygen pressure P and the current value Ib (the current value at the time of discharging) is obtained in advance through an experiment, it is possible to calculate the reduction $\gamma$ by identifying the oxygen pressure P and the current value Ib. Furthermore, if the correlation (map or function) of the reduction $\gamma$, the oxygen pressure P, the battery temperature Tb and the current value Ib (the current value at the time of discharging) is obtained in advance through an experiment, it is possible to calculate the reduction $\gamma$ by identifying the oxygen pressure P, the battery temperature Tb and the current value Ib.

With the following method as well, it is possible to estimate the internal pressure Pb of each single cell 11. The internal pressure Pb of each single cell 11 depends on the state of charge (SOC) and temperature Tb of the single cells 11. Therefore, a correlation (map or function) between the internal pressure Pb and at least one of the SOC and the battery temperature Tb is obtained in advance through an experiment, or the like. By identifying the SOC or the battery temperature Tb, it is possible to calculate (estimate) the internal pressure Pb on the basis of the above correlation. The SOC is the ratio of a current level of charge to a full-charge level. In the above description, the internal pressure Pb of each single cell 11 is estimated, and the internal pressure Pb of each battery block may also be estimated with a similar estimating method.

In step S105, the controller 30 determines whether the internal pressure Pb identified in the process of step S104 is higher than or equal to a first threshold Pref1. The first threshold Pref1 is allowed to be set as needed. Information about the first threshold Pref1 may be stored in the memory 31. For example, the first threshold Pref1 is set in consideration of the amount of produced oxygen gas inside the single cells 11.

Figure 5:
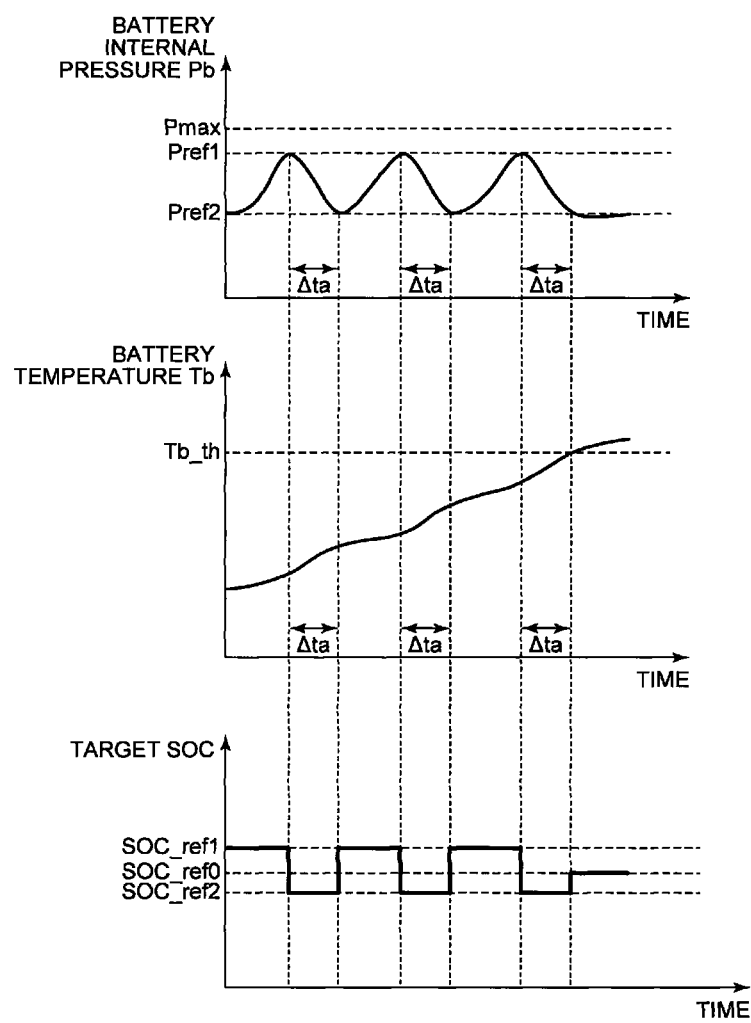
FIG. 5 is a time chart that shows changes in the internal pressure and temperature of the single cells and changes in target SOC.

As shown in FIG. 5, the first threshold Pref1 is set to a value lower than an upper limit value Pmax of the internal pressure Pb that is allowed by the single cell 11. As described above, the valve 115 is provided in each single cell 11 (battery case 112). Therefore, the upper limit value Pmax may be used as the operating pressure of the valve 115. Within the range in which the first threshold Pref1 is lower than the upper limit value Pmax, the first threshold Pref1 may be a fixed value or the first threshold Pref1 may be varied. By varying the first threshold Pref1, it is possible to adjust the amount of produced oxygen gas. That is, by varying the first threshold Pref1, it is possible to adjust the amount of heat that is generated through the side reaction expressed by the formula (4). Thus, it is possible to adjust the rate of increase in the temperature Tb of the single cells 11.

When the internal pressure Pb is higher than or equal to the first threshold Pref1, the controller 30 executes the process of step S106. On the other hand, when the internal pressure Pb is lower than the first threshold Pref1, the controller 30 returns to the process of step S103, and continues to raise the internal pressure Pb. In this way, until the internal pressure Pb reaches the first threshold Pref1, the internal pressure Pb continues rising.

In step S106, the controller 30 executes the process of decreasing the internal pressure Pb of each single cell 11. Specifically, the controller 30 is able to decrease the internal pressure Pb by discharging the single cells 11 (battery pack 10). By decreasing the internal pressure Pb, it is possible to cause the side reaction (exothermic reaction) expressed by the formula (4) to occur, and it is possible to raise the temperature Tb of the single cells 11.

When the single cells 11 are discharged, it is possible to carry out discharging without operating the motor generator MG2. For example, discharge current of the single cells 11 is allowed to flow through a resistive element. The step-up circuit includes a reactor, so it is possible to discharge the single cells 11 by causing current to flow through the reactor.

In step S107, the controller 30 identifies the internal pressure Pb of each single cell 11. The process of step S107 is the same as the process described in step S104. In the process of step S107, the single cell ills discharged by the process of step S106. Therefore, when the oxygen pressure Pn is calculated based on the formula (5), the amount a of produced oxygen gas becomes zero. In step S108, the controller 30 determines whether the internal pressure Pb identified in the process of step S107 is lower than or equal to a second threshold Pref2. The second threshold Pref2 may be set as needed. Information about the second threshold Pref2 may be stored in the memory 31.

The second threshold Pref2 is a value lower than the first threshold Pref1. Here, as the difference between the first threshold Pref1 and the second threshold Pref2 increases, the side reaction expressed by the formula (4) more easily occurs. The second threshold Pref2 may be set in consideration, of this point. Within the range in which the second threshold Pref1 is lower than the first threshold Pref1, the second threshold Pref2 may be a fixed value or the second threshold Pref2 may be varied. By varying the second threshold Pref2, it is possible to adjust the difference between the first threshold Pref1 and the second threshold Pref2. By adjusting the difference, it is possible to adjust the amount of heat that is generated through the side reaction expressed by the formula (4). Thus, it is possible to adjust the rate at which the temperature Tb of the single cells 11 is raised.

When the internal pressure Pb is lower than or equal to the second threshold Pref2, the controller 30 ends the process shown in FIG. 4. On the other hand, when the internal pressure Pb is higher than the second threshold Pref2, the controller 30 returns to the process of step S106, and continues to decrease the internal pressure Pb. In this way, until the internal pressure Pb reaches the second threshold Pref2, the internal pressure Pb continues decreasing.

With the process shown in FIG. 4, until the battery temperature Tb becomes higher than the predetermined temperature Tb_th, the internal pressure Pb of each single cell 11 varies between the first threshold Pref1 and the second threshold Pref2. Here, in the process of step S108 shown in FIG. 4, when the internal pressure Pb is lower than or equal to the second threshold Pref2 and when the battery temperature Tb is lower than or equal to the predetermined temperature Tb_th, the process of raising the internal pressure Pb is executed again in the process of step S103. FIG. 5 shows changes in the internal pressure Pb of each single cell 11 and the battery temperature Tb. In a period $\Delta t_a$ in which the internal pressure Pb is decreased, it is possible to raise the battery temperature Tb through the side reaction (exothermic reaction) expressed by the formula (4).

In the process shown in FIG. 4, after the process of raising the internal pressure Pb (the process of step S103) is executed, the process of decreasing the internal pressure Pb (the process of step S106) is executed; however, the process is not limited to this configuration. For example, when the internal pressure Pb rises in advance and is higher than or equal to the first threshold Pref1, it is possible to execute the process of decreasing the internal pressure Pb without executing the process of raising the internal pressure Pb. In the process (the process of step S102) shown in FIG. 4, it is determined whether the battery temperature Tb is lower than or equal to the predetermined temperature Tb_th; however, this determination process may be omitted. That is, the process from step S103, shown in FIG. 4, may be executed irrespective of the battery temperature Tb.

As shown in FIG. 5, by varying the internal pressure Pb between the first threshold Pref1 and the second threshold Pref2, it is possible to decrease the internal pressure Pb multiple times. By decreasing the internal pressure Pb multiple times, it is possible to allow the battery temperature Tb to easily rise. When the battery temperature Tb becomes higher than the predetermined temperature Tb_th, the process of raising the internal pressure Pb and the process of decreasing the internal pressure Pb are not executed anymore.

The process of decreasing the internal pressure Pb just needs to be executed until the battery temperature Tb becomes higher than the predetermined temperature Tb_th. The number of times the process of decreasing the internal pressure Pb is executed may be one or may be multiple. As shown in FIG. 5, when the internal pressure Pb is varied between the first threshold Pref1 and the second threshold Pref2, it is allowed to vary a target. SOC between an SOC_ref1 and an SOC_ref2.

The target SOC is a reference SOC at the time when the single cells 11 (battery pack 10) are charged or discharged. By setting the target SOC, the controller 30 controls charging and discharging of the single cells 11 such that the SOC of the single cells 11 varies along with the target SOC. When the SOC of the single cells 11 becomes higher than the target SOC, the single cells 11 are actively discharged such that the SOC of the single cells 11 approaches the target SOC. When the SOC of the single cells 11 becomes lower than the target SOC, the single cells 11 are actively charged such that the SOC of the single cells 11 approaches the target SOC.

A known method may be employed as needed as a method of estimating the SOC of the single cells 11 (battery pack 10). For example, by accumulating the current value Ib at the time when the single cells 11 (battery pack 10) are charged or discharged, it is possible to calculate (estimate) the SOC. The SOC and the OCV have a predetermined correlation, so the correlation is obtained in advance. By measuring the OCV, it is possible to calculate (estimate) the SOC on the basis of the above correlation.

When the single cells 11 are actively discharged, discharging of the single cells 11 is given a higher priority than charging of the single cells 11. When the single cells 11 are actively charged, charging of the single cells 11 is given a higher priority than discharging of the single cells 11. In charge/discharge control over the single cells 11, an actual SOC of the single cells 11 can be higher than the target SOC or can be lower than the target SOC.

An SOC_ref0 shown in FIG. 5 is the target SOC when the vehicle is traveling, and may be set in advance. The target SOC is a target SOC at the time when the heating process shown in FIG. 4 is not executed. The SOC_ref1 (which corresponds to a first SOC according to the invention) is a value higher than the SOC_ref0. The SOC_ref1 is set in order to allow the internal pressure Pb of each single cell 11 to reach the first threshold Pref1 in the process of step S103 in FIG. 4. The SOC_ref2 (which corresponds to a second SOC according to the invention) is a value lower than the SOC_ref0. The SOC_ref2 is set in order to allow the internal pressure Pb of each single cell 11 to reach the second threshold Pref2 in the process of step S106 in FIG. 4.

By varying the target SOC as shown in, FIG. 5, it is possible to vary the internal pressure Pb of each single cell 11 as shown in FIG. 5. When the battery temperature Tb is higher than the predetermined temperature Tb_th, the target, SOC is set to the SOC_ref0. As mentioned above, the SOC_ref1 is set according to the first threshold Pref1 and the SOC_ref2 is set according to the second threshold Pref2. Therefore, it is possible to set the SOC_ref1 and the SOC_ref2 higher than the SOC_ref0 and set them lower than the SOC_ref0. As shown in FIG. 5, it is possible to broaden the difference between the SOC_ref1 and the SOC_ref2 (the difference between the first threshold Pref1 and the second threshold Pref2) by increasing the SOC_ref1 over the SOC_ref0 and decreasing the SOC_ref2 below the SOC_ref0. As a result, it is possible to easily increase the amount of heat generation occurred by the side reaction expressed in the formula (4).

Figure 6:
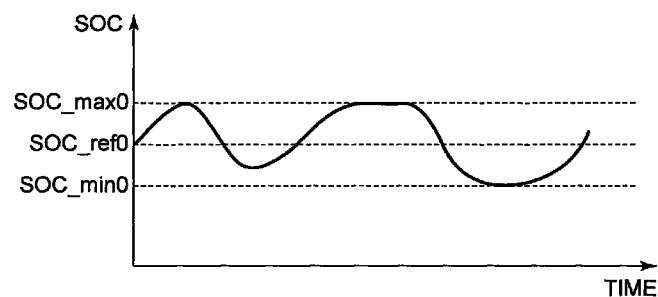
FIG. 6 is a time chart that shows changes in the SOC of the single cells.

When charging and discharging of the single cells 11 are controlled, an upper limit SOC (SOC_max0) and a lower limit SOC (SOC_min0) are set as shown in FIG. 6. In FIG. 6, the ordinate axis represents SOC, and the abscissa axis represents time. FIG. 6 shows (one example of) the behavior of the SOC of the single cells 11.

The SOC_max0 and the SOC_min0 are values at the time when the target SOC is set to the SOC_ref0. That is, the SOC_max0 and the SOC_min0 are values that are set at the time when the heating process shown in FIG. 4 is not executed. The SOC_max0 is a value higher than the SOC_ref0. The SOC_max0 is set in order to inhibit an overcharged state of the single cells 11. Specifically, the SOC_max0 is set to a value lower than the SOC indicating the overcharged state. The SOC_min0 is a value lower than the SOC_ref0. The SOC_min0 is set in order to inhibit an overdischarged state of the single cells 11. Specifically, the SOC_min0 is set to a value lower than the SOC indicating the overdischarged state.

As shown in FIG. 6, in controlling charging of the single cells 11, when the SOC of the single cells 11 has reached the SOC_max0, the single cells 11 are not charged anymore. Thus, it is possible to prevent the SOC of the single cells 11 from becoming higher than the SOC_max0. That is, charging of the single cells 11 is controlled such that the SOC of the single cells 11 varies within the range lower than or equal to the SOC_max0. In controlling discharging of the single cells 11, when the SOC of the single cells 11 has reached the SOC_min0, the single cells 11 are not discharged anymore. Thus, it is possible to prevent the SOC of the single cells 11 from becoming lower than the SOC_min0.

Figure 7:
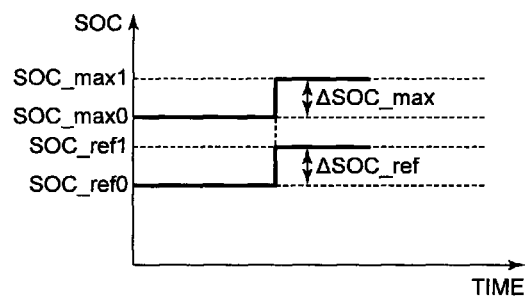
FIG. 7 is a time chart that shows changes (rise) in target SOC and changes in upper limit SOC.

In the present embodiment, as described with reference to FIG. 5, the target SOC can be changed from the SOC_ref0 (or the SOC_ref2) to the SOC_ref1. That is, the target SOC can be raised. In this case, in the process of step S103 shown in FIG. 4, as shown in FIG. 7, the upper limit SOC is allowed to be changed from the SOC_max0 to an SOC_max1. That is, the upper limit SOC is allowed to be raised. In FIG. 7, the ordinate axis represents SOC, and the abscissa axis represents time.

As shown in FIG. 7, the SOC_ref1 is allowed to be set to a value between the SOC_ref0 and the SOC_max0. In the example shown in FIG. 7, a difference ΔSOC_max between the SOC_max0 and the SOC_max1 is equal to a difference ΔSOC_ref between the SOC_ref0 and the SOC_ref1; however, the difference ΔSOC_max is not limited to this configuration. That is, the differences ΔSOC_max, ΔSOC_ref may be different from each other. Here, the SOC_max1 is desirably a value lower than the SOC indicating the overcharged state.

When the target SOC has been raised from the SOC_ref0 to the SOC_ref1, if the upper limit SOC remains at the SOC_max0, the SOC of the single cells 11 may easily reach the SOC_max0 at the time when the SOC of the single cells 11 is varied along with the SOC_ref1. In such a case, charging of the single cells 11 tends to be limited, and it may be hard to raise the SOC of the single cells 11.

As described above, as the SOC of the single cells 11 is raised, it is possible to raise the internal pressure Pb of the single cells 11 and heat is more easily generated through the side reaction expressed by the formula (4). If the upper limit SOC remains set at the SOC_max0, it is hard to raise the SOC of the single cells 11, and it is hard to generate heat associated with the side reaction. Therefore, when the target SOC is raised from the SOC_ref0 to the SOC_ref1, the upper limit SOC is also raised from the SOC_max0 to the SOC_max1. Thus, the SOC of the single cells 11 is easily raised.

Therefore, it is possible to increase the amount of heat that is generated through the side reaction expressed by the formula (4), so it is possible to easily raise the temperature Tb of the single cells 11. When the heating process shown in FIG. 4 is executed, it is possible to reduce a time that is required up to when the battery temperature Tb reaches the predetermined temperature Tb_th.

Even when the target SOC is raised from the SOC_ref0 to the SOC_ref1, it is also possible to keep the upper limit SOC at the SOC_max0. Even when the upper limit SOC remains at the SOC_max0, it is possible to raise the SOC of the single cells 11 by raising the target SOC from the SOC_ref0 to the SOC_ref1. Thus, even when the upper limit SOC remains at the SOC_max0, it is possible to increase the amount of heat generated through the side reaction expressed by the formula (4).

When the battery temperature Tb is higher than the predetermined temperature Tb_th through the process shown in FIG. 4, the target SOC is set to the SOC_ref0. Accordingly, the upper limit SOC is allowed to be changed from the SOC_max1 to the SOC_max0.

Figure 8:
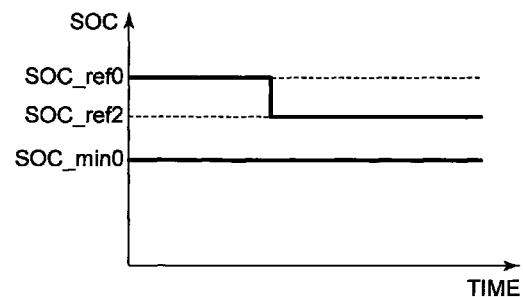
FIG. 8 is a time chart that shows changes (decrease) in target SOC and a lower limit SOC.

On the other hand, in the present embodiment, as described with reference to FIG. 5, the target SOC can decrease from the SOC_ref1 to the SOC_ref2. In this case, as shown in FIG. 8, the lower limit SOC is allowed to be kept at the SOC_min0. In FIG. 8, the ordinate axis represents SOC, and the abscissa axis represents time. Even when the lower limit SOC is decreased with a decrease in the target SOC, it is not possible to increase the amount of heat that is generated through the side reaction expressed by the formula (4).

The amount of heat that is generated through the side reaction expressed by the formula (4) depends on the amount of produced (the amount of increase in) oxygen gas resulting from raising of the SOC of the single cells 11. When the SOC of the single cells 11 is decreased, oxygen gas reduces. Therefore, even when the lower limit SOC is decreased, the amount of heat that is generated through the side reaction expressed by the formula (4) is hard to increase. Thus, the lower limit SOC does not need to be decreased. Specifically, after raising the SOC of the single cells 11, the SOC of the single cells 11 just needs to be brought close to the lower limit SOC.

In FIG. 7, the upper limit SOC is raised with a rise in the target SOC; however, the upper limit SOC is not limited to this configuration. Specifically, when the target SOC is raised from the SOC_ref0 to the SOC_ref1, it is possible to raise an electric power (allowable input power) Win_ref at or below which the input (charging) of the single cells 11 is allowed. The allowable input power Win_ref is an upper limit value of an electric power at or below which the single cells 11 are allowed to be charged. When the single cells 11 are charged, the current value Ib is treated as a negative value. Therefore, the allowable input power Win_ref becomes a negative value. Charging of the single cells 11 is Controlled such that the input power of the single cells 11 does not exceed the allowable input power Win_ref.

Figure 9:
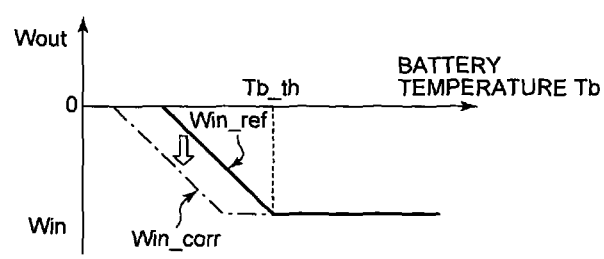
FIG. 9 is a graph that shows the correlation between an allowable input power value and a battery temperature.

The allowable input power Win_ref indicated by the continuous line in FIG. 9 is set on the basis of the battery temperature Tb. Specifically, when the battery temperature Tb is higher than or equal to the predetermined temperature Tb_th, the allowable input power Win_ref is set to a predetermined value (constant value). On the other hand, when the battery temperature Tb is lower than the predetermined temperature Tb_th, the allowable input power (absolute value) Win_ref is changed. That is, as the battery temperature Tb decreases with respect to the predetermined temperature Tb_th, the allowable input power (absolute value) Win_ref decreases. In other words, as the battery temperature Tb approaches the predetermined temperature Tb_th, the allowable input power (absolute value) Win_ref increases. As shown in FIG. 9, the allowable input power (absolute value) Win_ref is set to 0 [kw] depending on the battery temperature Tb.

A correlation between the allowable input power Win_ref and the battery temperature Tb, shown in FIG. 9, may be obtained in advance through an experiment, or the like, in consideration of the input characteristics, and the like, of the single cells 11. Information about the correlation (map or function) shown in FIG. 9 may be stored in the memory 31. The controller 30 is able to calculate the allowable input power Win_ref corresponding to the battery temperature Tb with, the use of the correlation shown in FIG. 9 by detecting the battery temperature Tb. The controller 30 is able to control charging of the single cells 11 on the basis of the calculated allowable input power Win_ref.

In the example shown in FIG. 9, the temperature at which the allowable input power (absolute value) Win_ref starts being decreased is equal to the predetermined temperature Tb_th described in the process (step S102) shown in FIG. 4; however, the temperature at which the allowable input power (absolute value) Win_ref starts being decreased is not limited to this configuration. That is, the temperature at which the allowable input power (absolute value) Win_ref starts being decreased may be different from the predetermined temperature Tb_th described in the process (step S102) shown in FIG. 4.

The allowable input power Win_ref is a value at which the target SOC is set at the SOC_ref0. That is, Win_ref is a value that is set at the time when the heating process shown in FIG. 4 is not executed. When the target SOC has risen from the SOC_ref0 to the SOC_ref1, it is allowed to set an allowable input power Win_corr indicated by the alternate long and short dashed line in FIG. 9. As shown in FIG. 9, when the battery temperature Tb falls within the range lower than the predetermined temperature Tb_th, the allowable input power (absolute value) Win_corr is higher than the allowable input power (absolute value) Win_ref. The allowable input power (absolute value) Win_ref can change depend on the battery temperature Tb. That is, when the target SOC is raised to the SOC_ref1, it is allowed to raise the allowable input power (absolute value) Win. Here, the allowable input power (absolute value) Win_corr just needs to be higher than the allowable input power (absolute value) Win_ref, and a specific electric power value may be set as needed. When the battery temperature Tb is higher than the predetermined temperature Tb_th, the allowable input power (absolute value) Win_ref is equal to the allowable input power (absolute value) Win_corr. The allowable input power (absolute value) Win_ref and the allowable input power (absolute value) Win_corr may be 0 [kw] depending on the battery temperature Tb.

When the allowable input power Win_corr is set and the allowable input power Win_corr is higher than the input power Win_ref, the single cells 11 are more easily charged, and the SOC of the single cells 11 is more easily raised. Accordingly, it is possible to increase the amount of heat that is generated through the side reaction expressed by the formula (4), so the temperature Tb of the single cells 11 is more easily raised. In executing the heating process shown in FIG. 4, it is possible to reduce a time that is required up to when the battery temperature Tb reaches the predetermined temperature Tb_th.

Figure 10:
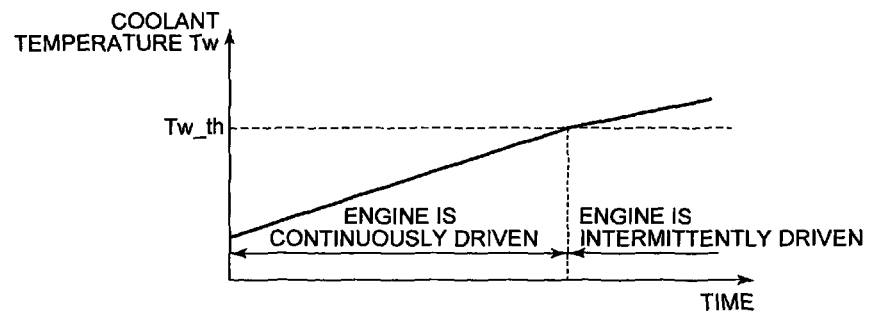
FIG. 10 is a time chart that illustrates a driving state of an engine based on the temperature of coolant.

In the process shown in FIG. 4, when the single cells 11 are charged, it is allowed to use the output of the engine 26. Here, when an air conditioner mounted on the vehicle is set to a heating mode, the passenger compartment is heated by using coolant that has received heat from the engine 26. As shown in FIG. 10, when the temperature Tw of coolant is lower than a reference temperature Tw_th, the engine 26 is continuously driven until the temperature Tw rises to the reference temperature Tw_th. When the temperature Tw becomes higher than or equal to the reference temperature Tw_th, the engine 26 is allowed to be intermittently driven. That is, when the temperature Tw becomes higher than or equal to the reference temperature Tw_th, the engine is intermittently driven such that the temperature Tw is kept.

Figure 11:
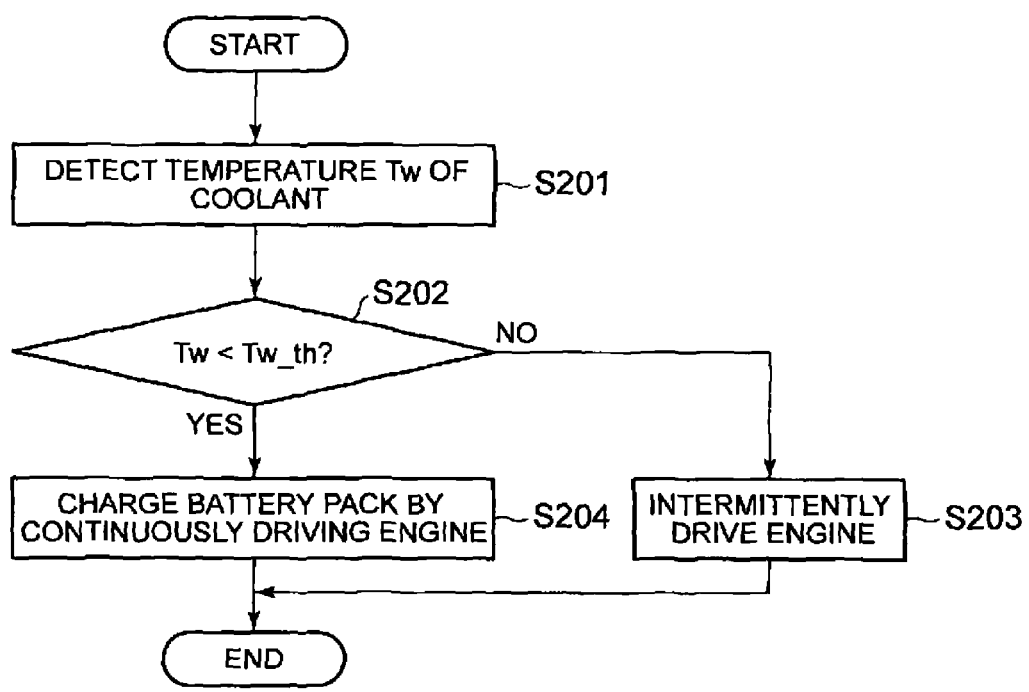
FIG. 11 is a flowchart that shows a process that is executed at the time when a heating mode is set.

The above-described process will be described with reference to the flowchart shown in FIG. 11. The process shown in FIG. 11 is executed by the controller 30 at predetermined intervals when an air conditioner is set in a heating mode. In step S201, the controller 30 detects the temperature Tw of coolant on the basis of the output of the temperature sensor 27. In step S202, the controller 30 determines whether the temperature Tw detected in the process of step S201 is lower than the reference temperature Tw_th. The reference temperature Tw_th may be set as needed.

When the temperature Tw of coolant is higher than or equal to the reference temperature Tw_th, the controller 30 intermittently drives the engine 26 in step S203. When the temperature Tw of coolant is lower than the reference temperature Tw_th, the controller 30 continuously drives the engine 26 in step S204. When the engine 26 is continuously driven, the controller 30 charges the battery pack 10 (single cells 11) by using the output of the engine 26. When the engine 26 is driven in this way, it is possible to charge the battery, pack 10 by supplying the battery pack 10 with electric power generated by the motor generator MG1.

The engine 26 is continuously driven until the temperature Tw becomes higher than or equal to the reference temperature Tw_th, so the single cells 11 are allowed to be charged by using the output of the engine 26 at this time. When the temperature Tw is lower than the reference temperature Tw_th, the battery temperature Tb tends to become lower than the predetermined temperature Tb_th. Therefore, the single cells 11 are charged by driving the engine 26 for raising the temperature Tw, so it is possible to easily generate heat and raise the battery temperature Tb through the side reaction expressed by the formula (4) at the time when the single cells 11 are discharged.

A user of the vehicle may understand that the engine 26 is continuously driven while the temperature Tw is being raised. If the SOC of the single cells 11 is raised by actively driving the engine 26 although the engine 26 is allowed to be intermittently driven, there is a concern that the user may experience a feeling of strangeness. Therefore, when the SOC of the single cells 11 is raised while the engine 26 is continuously driven, it is possible to suppress a feeling of strangeness experienced by the user.

The invention claimed is:

1. A heating system comprising:
   an alkaline secondary battery including a power generating element configured to be charged or discharged and a battery case that accommodates the power generating element in a hermetically sealed state; and
   a controller configured to control charging and discharging of the alkaline secondary battery and, when an internal pressure of the alkaline secondary battery is higher than or equal to a first threshold, execute a heating process for heating the alkaline secondary battery by decreasing the internal pressure through discharging of the alkaline secondary battery, the heating process raising a temperature of the alkaline secondary battery, wherein
   when the heating process is executed and the internal pressure is lower than or equal to a second threshold lower than the first threshold, the controller is configured to raise the internal pressure by charging the alkaline secondary battery.

2. The heating system according to claim 1, wherein when the heating process is executed, the controller is configured to vary the internal pressure between the first threshold and the second threshold by alternately executing a process of raising the internal pressure and a process of decreasing the internal pressure.

3. The heating system according to claim 1 wherein the controller is configured to control charging and discharging of the alkaline secondary battery such that an SOC of the alkaline secondary battery varies along with a target SOC, the controller is further configured to set a first SOC corresponding to the first threshold for the target SOC when the internal pressure is raised and set a second SOC corresponding to the second threshold for the target SOC when the internal pressure is decreased, and the second SOC is a value lower than the first SOC.

4. The heating system according to claim 3, wherein the first SOC is higher than a target SOC that is preset at the time when the heating process is not executed, and the second SOC is lower than the target SOC that is preset at the time when the heating process is not executed.

5. The heating system according to claim 4, wherein the controller is configured to control charging of the alkaline secondary battery such that the SOC of the alkaline secondary battery varies within a range lower than or equal to an upper limit SOC, and the controller is further configured to raise the upper limit SOC above the upper limit SOC that is set at the time when the heating process is not executed, when the first SOC is set.

6. The heating system according to claim 4, wherein the controller is configured to control charging of the alkaline secondary battery such that an electric power that is input to the alkaline secondary battery varies within a range lower than or equal to an upper limit electric power that is set on the basis of the temperature of the alkaline secondary battery, and the controller is further configured to raise the upper limit electric power above the upper limit electric power that is set at the time when the heating process is not executed, when the first SOC is set.

7. The heating system according to claim 1, wherein the controller is configured to change at least one of the first threshold and the second threshold.

8. The heating system according to claim 1, wherein the heating system is mounted on a vehicle including an engine, and the controller is configured to raise the internal pressure by charging the alkaline secondary battery by using an output of the engine when the following a) and b) are satisfied,
   a) a passenger compartment of the vehicle is heated by using coolant that cools the engine, and
   b) the engine is driven until the temperature of the coolant becomes higher than or equal to a reference temperature.

9. The heating system according to claim 1, further comprising:
   a temperature sensor configured to detect a temperature of the alkaline secondary battery, wherein
   the controller is configured to execute the heating process when the temperature detected by the temperature sensor is lower than or equal to a predetermined temperature.

10. The heating system according to claim 9, further comprising:
    a current sensor configured to detect a current value of the alkaline secondary battery, wherein
    the controller is configured to estimate the internal pressure on the basis of the oxygen pressure that is estimated on the basis of an equilibrium hydrogen pressure inside the alkaline secondary battery and an amount of increase in oxygen gas and an amount of reduction in the oxygen gas inside the alkaline secondary battery,
    the controller is configured to calculate the equilibrium hydrogen pressure on the basis of the temperature of the alkaline secondary battery,
    the controller is configured to calculate the amount of increase in the oxygen gas on the basis of the current value of the alkaline secondary battery when the alkaline secondary battery is charged, and
    the controller is configured to calculate the amount of reduction in the oxygen gas on the basis of the temperature of the alkaline secondary battery.

11. The heating system according to claim 1, further comprising:
    a temperature sensor configured to detect the temperature of the alkaline secondary battery; and
    a current sensor configured to detect a current value of the alkaline secondary battery, wherein
    the controller is configured to estimate the internal pressure on the basis of the oxygen pressure that is estimated on the basis of an equilibrium hydrogen pressure inside the alkaline secondary battery and an amount of increase in oxygen gas and an amount of reduction in the oxygen gas inside the alkaline secondary battery, the controller is configured to calculate the equilibrium hydrogen pressure on the basis of the temperature of the alkaline secondary battery, the controller is configured to calculate the amount of increase in the oxygen gas is calculated on the basis of the current value of the alkaline secondary battery when the alkaline secondary battery is charged, and the controller is configured to calculate the amount of reduction in the oxygen gas on the basis of the temperature of the alkaline secondary battery.

12. A battery system comprising:

an alkaline secondary battery;

a temperature sensor configured to detect a temperature of the alkaline secondary battery; and a controller configured to execute a first process at least once when the temperature detected by the temperature sensor is lower than or equal to a predetermined temperature, the first process being a process of decreasing an internal pressure of the alkaline secondary battery, wherein the controller is configured to alternately execute the first process and a second process multiple times when the temperature detected by the temperature sensor is lower than or equal to a predetermined temperature, the second process being a process of raising the internal pressure of the alkaline secondary battery.

13. The battery system according to claim 12, wherein the controller is configured to execute the second process and then execute the first process when the temperature detected by the temperature sensor is lower than or equal to a predetermined temperature.

14. The battery system according to claim 12, wherein when the temperature detected by the temperature sensor is lower than a predetermined temperature, the controller is configured to execute the first process after the internal pressure of the alkaline secondary battery has reached a first threshold and execute the second process after the internal pressure of the alkaline secondary battery has reached a second threshold, the first threshold being higher than the second threshold.

15. The battery system according to claim 12, wherein the controller is configured to execute the first process by discharging the alkaline secondary battery.

16. The battery system according to claim 12, wherein the controller is configured to execute the second process by charging the alkaline secondary battery.

17. The battery system according to claim 12, wherein when the temperature detected by the temperature sensor becomes higher than a predetermined temperature, the controller is configured to stop at least the first process.

18. The battery system according to claim 12, wherein the controller is configured to control an SOC of the alkaline secondary battery and execute the first process by setting a target SOC of the alkaline secondary battery to a first target SOC, the first target SOC being lower than the target SOC at the time when the temperature is higher than a predetermined temperature.

19. The battery system according to claim 18, wherein when the temperature detected by the temperature sensor becomes higher than a predetermined temperature, the controller is configured to set the target SOC of the alkaline secondary battery to a predetermined target SOC.

20. The battery system according to claim 18, wherein the battery system is mounted on a vehicle including an engine, and the controller is configured to set the target SOC of the alkaline secondary battery to the first target SOC when the engine is being driven.

21. The battery system according to claim 20, wherein the controller is configured to charge the alkaline secondary battery by driving the engine when the temperature of coolant of the engine is lower than a reference temperature.

22. The battery system according to claim 21, wherein the vehicle includes an air conditioner, and the controller is configured to charge the alkaline secondary battery by driving the engine when the air conditioner is set in a heating mode and the temperature of the coolant of the engine is lower than the reference temperature.

23. The battery system according to claim 21, wherein the controller is configured to intermittently drive the engine when the temperature of the coolant of the engine is higher than the reference temperature.

24. The battery system according to claim 12, wherein the controller is configured to control an SOC of the alkaline secondary battery and execute the second process by setting a target SOC of the alkaline secondary battery to a second target SOC, the second target SOC being higher than the target SOC at the time when the temperature is higher than a predetermined temperature.

* * * * *